US008549426B2

(12) United States Patent
Kim

(10) Patent No.: US 8,549,426 B2
(45) Date of Patent: Oct. 1, 2013

(54) APPARATUS AND METHOD FOR CONFIGURING AN ON-SCREEN IMAGE IN A MOBILE TELECOMMUNICATION HANDSET UPON CONNECTION OF EARPHONE

(75) Inventor: Young-Chul Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 427 days.

(21) Appl. No.: 11/473,843

(22) Filed: Jun. 23, 2006

(65) Prior Publication Data

US 2006/0290807 A1 Dec. 28, 2006

(30) Foreign Application Priority Data

Jun. 24, 2005 (KR) ........................ 10-2005-0055236

(51) Int. Cl.
*G06F 3/048* (2013.01)
(52) U.S. Cl.
USPC ...... 715/810; 715/855; 455/569.1; 455/575.2
(58) Field of Classification Search
USPC ................. 715/810, 808, 864, 855; 348/468; 455/569.1, 575.2, 566
See application file for complete search history.

(56) References Cited

U.S. PATENT DOCUMENTS

| | | | | |
|---|---|---|---|---|
| 5,475,872 A * | 12/1995 | Sato | ............................ | 455/550.1 |
| 6,122,530 A * | 9/2000 | Overy et al. | .................. | 455/566 |
| 6,195,570 B1 * | 2/2001 | Ishida | ............................ | 455/566 |
| 6,519,475 B1 * | 2/2003 | Kim | ............................. | 455/557 |
| 6,798,882 B2 * | 9/2004 | Kupiainen | ............... | 379/433.04 |
| 6,845,408 B1 * | 1/2005 | Lemke et al. | .................... | 710/18 |
| 7,027,841 B2 * | 4/2006 | Ishii | ............................. | 455/569.1 |
| 7,035,897 B1 * | 4/2006 | Devereaux et al. | ........... | 709/203 |
| 7,076,057 B1 * | 7/2006 | Sharp | ........................ | 379/433.06 |
| 7,107,010 B2 * | 9/2006 | Heinonen et al. | ............ | 455/41.2 |
| 7,215,975 B1 * | 5/2007 | Sharp | ......................... | 455/550.1 |
| 7,292,880 B2 * | 11/2007 | Lehtonen | ................... | 455/569.1 |
| 7,395,090 B2 * | 7/2008 | Alden | .......................... | 455/557 |
| 7,633,516 B2 * | 12/2009 | Tamura | ...................... | 348/14.01 |
| 7,917,791 B2 * | 3/2011 | Asai et al. | ...................... | 713/324 |
| 2001/0048685 A1 * | 12/2001 | Park et al. | ..................... | 370/401 |
| 2002/0068610 A1 * | 6/2002 | Anvekar et al. | .............. | 455/560 |
| 2002/0098878 A1 * | 7/2002 | Mooney et al. | ............... | 455/569 |
| 2004/0117847 A1 * | 6/2004 | Karaoguz et al. | ............. | 725/134 |
| 2004/0123321 A1 * | 6/2004 | Striemer | ......................... | 725/62 |
| 2004/0248594 A1 * | 12/2004 | Wren, III | ...................... | 455/465 |
| 2005/0070327 A1 | 3/2005 | Watanabe | | |
| 2005/0102638 A1 * | 5/2005 | Jiang et al. | ..................... | 715/855 |
| 2005/0239469 A1 * | 10/2005 | Vallstrom et al. | ............. | 455/445 |
| 2005/0276570 A1 * | 12/2005 | Reed et al. | ....................... | 386/46 |
| 2006/0045304 A1 * | 3/2006 | Lee et al. | ........................ | 381/384 |
| 2006/0258396 A1 * | 11/2006 | Matsuoka | .................. | 455/556.1 |
| 2008/0090534 A1 * | 4/2008 | Wai | .............................. | 455/187.1 |

FOREIGN PATENT DOCUMENTS

CN 1224319 7/1999

* cited by examiner

*Primary Examiner* — Phenuel Salomon
(74) *Attorney, Agent, or Firm* — Lee, Hong, Degerman, Kang & Waimey

(57) ABSTRACT

Apparatus and a method for configuring an on-screen image in a mobile telecommunications handset making it possible for a multimedia menu to be displayed when a connected earphone is recognized, thereby allowing a user to conveniently select a multimedia application without having to use a keypad for initiating an instruction to perform the multimedia application.

27 Claims, 3 Drawing Sheets

APPARATUS AND METHOD FOR CONFIGURING AN ON-SCREEN IMAGE IN A MOBILE TELECOMMUNICATION HANDSET UPON CONNECTION OF EARPHONE

CROSS-REFERENCE TO RELATED APPLICATIONS

Pursuant to 35 U.S.C. §119(a), this application claims the benefit of earlier filing date and right of priority to Korean Application No. 55236/2005, filed on Jun. 24, 2005, the contents of which are hereby incorporated by reference herein in their entirety.

BACKGROUND OF THE INVENTION

The present invention relates to a configuration of an on-screen image in a mobile telecommunications handset terminal, and more particularly to an apparatus and a method for configuring an on-screen image which is displayed upon connecting of an earphone to a terminal capable of providing a multimedia service.

Developments in mobile telecommunications technology have enabled a mobile telecommunications handset to support a variety of multimedia service, in addition to a basic voice service. To meet various demands of customers, terminals offer multimedia services such as a motion picture player, an MP3 audio file player and a TV receiver, in addition to a basic service such as a voice service and an SMS (Short Message Service).

An additional device may be provided to a terminal to support the multimedia service more effectively. For example, an earphone or headset may be connected to the terminal to allow a user to privately enjoy the multimedia service without disturbing others in the vicinity.

However, only an active operational state of the mobile telecommunications handset is displayed in an indicator area on the terminal display screen when the earphone is connected. This requires a user to manually search for a function menu from which to select a multimedia application in order to enjoy the multimedia service.

BRIEF DESCRIPTION OF THE INVENTION

The present invention provides an apparatus and a method for configuring an on-screen display of a terminal enabling a user to conveniently select a multimedia application when an earphone is connected to the terminal.

To achieve these and other advantages and in accordance with the purpose of the present invention, as embodied and broadly described herein, an apparatus is provided for configuring a terminal on-screen display, the apparatus comprising a connecting unit to which an earphone may be connected, a control unit recognizing connection of the earphone for executing a multimedia menu, and a display unit enabling a user to select a multimedia application from the multimedia menu and displaying an on-screen image component of the selected multimedia application.

When the earphone is disconnected from the terminal, the control unit may continually display an image component of the selected multimedia application, or display an on-screen image for a pre-determined time without performing the selected multimedia application.

When a call arrives during the performance of the selected multimedia application, the control unit may continually display the image component of the selected multimedia application while a call is in progress, or display an image for an in-process call.

A method is also provided for configuring a display terminal display comprising recognizing the connection of an earphone, displaying a multimedia menu for selecting multimedia applications when the earphone is recognized, selecting a multimedia application from the displayed multimedia menu, and performing the selected multimedia application.

The multimedia menu may include multimedia applications selection items for playing MP3 music files, watching TV, displaying video and such. In addition, the multimedia menu may be displayed in a cascade, tiled or in a pop-up menu mode when the connected earphone is recognized.

The multimedia menu may be displayed when the display unit is in an idle state.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

IN THE DRAWINGS

Figure 1:
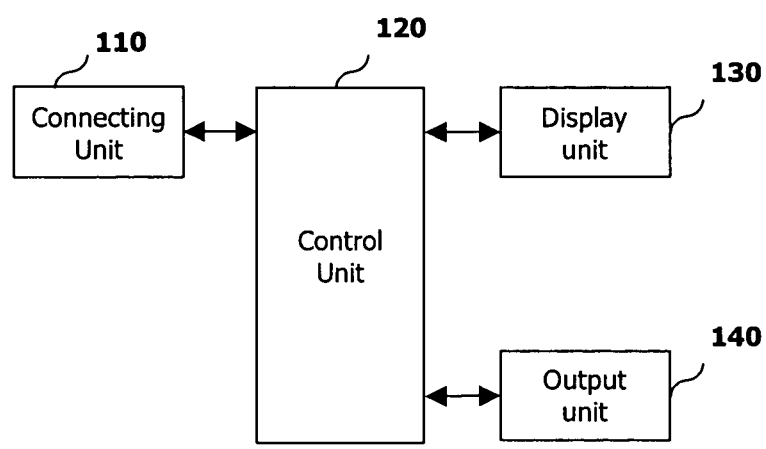

FIG. 1 shows a block diagram of an apparatus for configuring an on-screen image in a mobile telecommunications handset according to the present invention.

Figure 2:
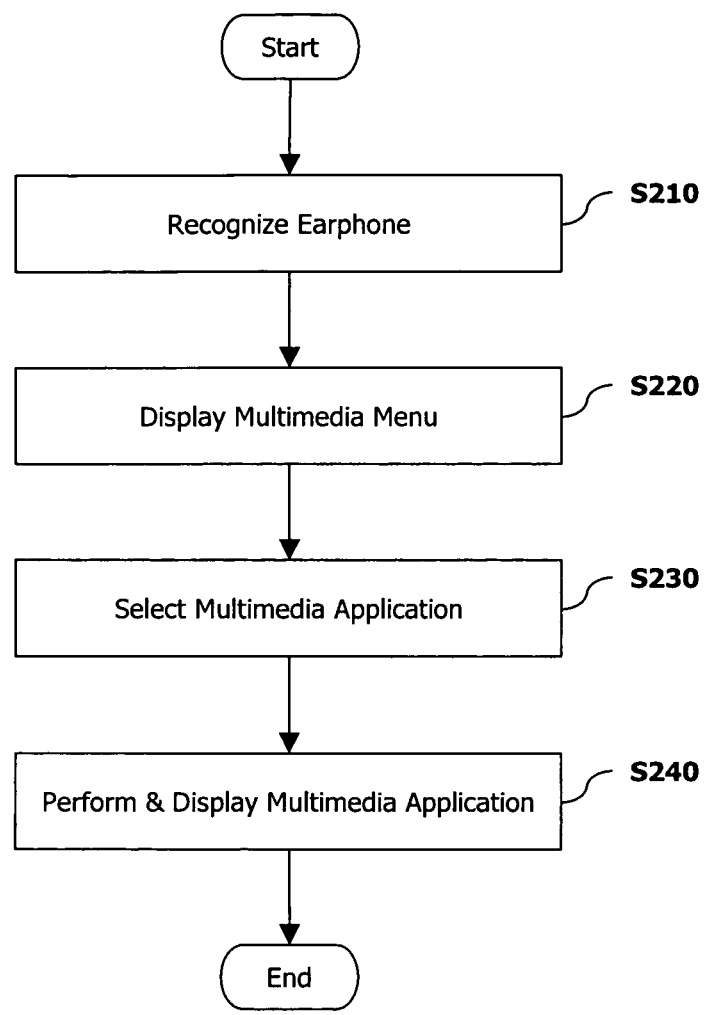

FIG. 2. is a flow chart showing a method for configuring a terminal display of the present invention.

Figure 3:
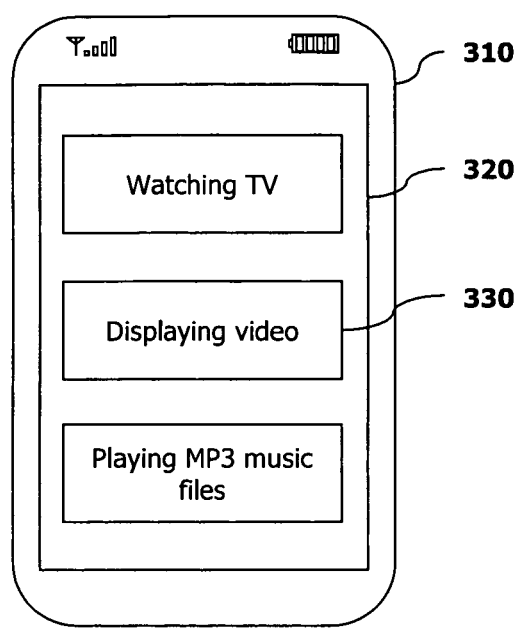

FIG. 3. schematically shows a terminal multimedia menu display in accordance with the present invention.

DETAILED DESCRIPTION OF THE INVENTION

The present invention will now be described in detail, examples of which are illustrated in the accompanying drawings.

The present invention is an apparatus and a method for displaying a multimedia menu on a terminal display when an earphone is connected to the terminal, thereby enhancing a user's enjoyment of a multimedia service.

The earphone connected to the mobile telecommunications handset may include a headphone or a head phone combined with a microphone.

FIG. 1 is a block diagram for a terminal according to the present invention.

The apparatus for displaying an on-screen image, as shown in FIG. 1, includes a connecting unit 110 for connecting an earphone, a control unit 120 recognizing the connection of the earphone for displaying a multimedia menu on a display unit 130 and for selection of a multimedia application from the multimedia menu, and an output unit 140 providing a sound component of the selected multimedia application.

Also, the control unit 120 may immediately perform the preset multimedia applications (i.e., playing an MP3 music file, playing motion pictures and watching TV) when the connected earphone is recognized.

The control unit 120 displays an on-screen image component of the selected multimedia application, or displays an on-screen image for a predetermined time without performing the selected multimedia application, when the earphone is disconnected from the terminal.

The control unit 120 displays the on-screen image component of the selected multimedia application while a call is in progress, or displays an on-screen image for an in-process call when the call arrives during performing of the selected media component.

The control unit 120 displays a present multimedia application at the time of an earphone-connection.

The display unit 130 displays the multimedia menu in a cascade, tiled, or pop-up mode when the connected earphone is recognized. The multimedia menu includes selection items for multimedia applications for playing MP3 music files, watching TV and displaying videos.

The output 140 provides a sound component of the selected multimedia application.

FIG. 2. shows is a flowchart of a method for displaying an on-screen image on a terminal according to the present invention.

The method for displaying an on-screen image on a terminal includes recognizing a connected earphone when the earphone is connected to the connecting unit (S210), displaying a multimedia menu for selecting multimedia applications while the earphone is recognized (S220), selecting a multimedia application from the displayed multimedia menu (S230), and performing the selected multimedia application (S240).

At step S220, the multimedia menu is displayed when the terminal is in an idle state and no incoming call exists.

The method may further include continually displaying an on-screen image component of the selected multimedia application without performing the selected media application when the earphone is disconnected from the mobile telecommunications handset.

The method may further include allowing the control unit to display an on-screen image for an in-process call when a call arrives during the performance of the selected multimedia application.

The multimedia menu includes selection items for multimedia applications for playing music, displaying video and watching TV, providing such functions are supported by the terminal. A multimedia application is performed by choosing the multimedia application shown in the multimedia menu.

The multimedia menu may be displayed in a cascade, tiled, or pop-up mode when the connected earphone is recognized.

The method for controlling the configuration of an on-screen image in a terminal according to the present invention will be now described in more detail.

Referring to FIGS. 1-3, the control unit 120 recognizes a connected earphone such as by a "jack sensing" function and indicates in an area on the display unit 130 that the earphone is connected to the terminal.

The display unit 130 may be an LCD (Liquid Crystal Display) screen 310 where the on-screen image component of the selected media component is displayed.

The control unit 120 indicates the connected state of the earphone and the receiving state of a call on the display unit 130, when a call is received while the earphone is connected to the terminal.

However, if the control unit 120 determines that the display unit 130 is in an idle state when no incoming call is present while the earphone is connected, then the control unit 120 displays the multimedia menu 320 for playing MP3 music files, displaying video and watching TV.

At this point, the multimedia menu 320 may be displayed in a cascade, tiled or pop-up mode.

The multimedia menu 320 may include selection items of multimedia applications for playing MP3 music files, displaying video and watching TV.

When a multimedia application 330 labeled as "displaying video" is selected from the displayed multimedia menu 320, the control unit 120 displays an on-screen image component of the selected multimedia application on the display unit 130 and provides a sound component of the selected multimedia application through the outputting unit 140.

When the earphone is disconnected during playing of the multimedia application, the control unit 120 continually displays the on-screen image component of the multimedia application or displays an on-screen image for a predetermined time without performing the multimedia application.

The term "idle screen image" means a state when none of the multimedia applications is being performed and no image component of a multimedia application is being displayed on the display unit 130. This state is referred to as an idle state.

The configuration of an on-screen image in a terminal according to the present invention makes it possible for a terminal to recognize a connected earphone in order to display a multimedia menu, enabling a user to conveniently select a multimedia application from the multimedia menu without having to use a keypad for initiating the multimedia application.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for displaying an on-screen image in a mobile telecommunications handset, the method comprising:
   recognizing connection of an earphone to the mobile telecommunications handset for outputting an audio component of a multimedia application when the mobile telecommunications handset is in an idle state due to call inactivity;
   displaying, on a display of the mobile telecommunications handset, a multimedia menu comprising a plurality of selectable items each corresponding to one of a plurality of multimedia applications that are activatable in response to recognizing connection of the earphone, wherein the mobile telecommunications handset is no longer in the idle state when displaying the multimedia menu;
   selecting one multimedia application of the plurality of multimedia applications in response to selection of one of the plurality of items from the displayed multimedia menu to perform the selected one multimedia application;
   outputting audible data via the earphone and outputting visual data via the display when the selected one multimedia application is performed;
   detecting removal of the earphone from the mobile telecommunications handset while performing the selected one multimedia application; and
   stopping performance of the selected one multimedia application and displaying one image from the visual data in response to detecting removal of the earphone, wherein:

the output audible data and visual data are from a same multimedia content that is reproduced when the selected one multimedia application is performed;
the visual data comprises video data; and
the one image of the visual data is continuously displayed until further user interaction after performing the selected one multimedia application.

2. The method according to claim 1, wherein the earphone is combined with a microphone.

3. The method according to claim 1, further comprising displaying an on-screen image for processing an incoming call when the incoming call arrives during the performance of the selected one multimedia application.

4. The method according to claim 1, further comprising continually displaying an on-screen image component of the visual data while processing an incoming call when the incoming call arrives during the performance of the selected one multimedia application.

5. The method according to claim 1, wherein a first one of the plurality of multimedia applications is activated for playing an MP3 file, a second one of the plurality of multimedia applications is activated for displaying video, and a third one of the plurality of multimedia applications is activated for watching TV.

6. The method according to claim 1, wherein the multimedia menu is displayed in a pop-up mode when the connected earphone is recognized.

7. The method according to claim 1, wherein the multimedia menu is displayed in a tiled mode when the connected earphone is recognized.

8. The method according to claim 1, further comprising displaying an on-screen image for processing an incoming call at a user's request when the call arrives while the earphone is connected.

9. The method according to claim 1, wherein the one multimedia application is selected in response to a user action.

10. The method according to claim 1, wherein the one multimedia application is automatically selected according to a preset setting.

11. A mobile telecommunications handset comprising:
a connecting unit configured to connect an earphone for outputting an audio component of a multimedia application;
a display for outputting a visual component of the multimedia application; and
a control unit configured to:
recognize the connected earphone when the mobile telecommunications handset is in an idle state due to call inactivity;
control the display to display a multimedia menu comprising a plurality of selectable items each corresponding to one of a plurality of multimedia applications in response to recognizing the connected earphone, the multimedia menu displayed while the earphone is connected;
perform a selected multimedia application when the multimedia application is selected from the displayed multimedia menu;
control the earphone to output audible data and control the display to output visual data when the selected multimedia application is performed;
detect removal of the earphone from the connecting unit while performing the selected multimedia application;
stop performing the selected multimedia application and control the display to display one image from the visual data in response to detecting removal of the earphone; and control the display to continuously display the one image until further user interaction is performed after performing the selected multimedia application,
wherein:
the output audible data and visual data are from a same multimedia content that is reproduced when the selected one multimedia application is performed; and
the visual data comprises video data.

12. The handset according to claim 11, wherein the control unit is further configured to control the display to display an on-screen image for processing an incoming call when the incoming call arrives during the performance of the selected multimedia application.

13. The handset according to claim 11, wherein the control unit is further configured to control the display to continually display the on-screen image component of the visual data while processing a call when the call arrives during the performance of the selected multimedia application.

14. The handset according to claim 11, wherein the selected multimedia menu is displayed in a pop-up mode on the display.

15. The handset according to claim 11, wherein a first one of the plurality of multimedia applications is activated for playing an MP3 file, a second one of the plurality of multimedia applications is activated for playing motion pictures and a third one of the plurality of multimedia applications is activated for watching TV.

16. The handset according to claim 11, wherein the earphone includes a headphone and a microphone.

17. The handset according to claim 11, wherein the one multimedia application is selected in response to a user action.

18. The handset according to claim 11, wherein the one multimedia application is automatically selected according to a preset setting.

19. A mobile device comprising:
a transceiver configured to send and receive signals via a wireless communication network;
a display unit configured to display information;
a connector configured to connect earphones to the mobile device for outputting an audio component of a multimedia application; and
a processor configured to process commands between the transceiver, the display unit, and the connector in order to operate a first mode when the earphones are connected to the mobile device or a second mode when the earphones are removed from the mobile device,
wherein the first mode comprises:
detecting a connection of the earphones via the connector;
displaying, via the display unit, a multimedia menu comprising a plurality of selectable items each corresponding to one of a plurality of multimedia applications that are activatable in response to the detected connection of the earphones, the multimedia menu displayed while the earphones are connected;
performing a multimedia application selected by a user from the displayed multimedia menu;
outputting audible data via the earphones and outputting visual data via the display unit when the selected multimedia application is performed, and
wherein the second mode comprises:
detecting removal of the earphones from the connector while performing the selected multimedia application; and
stopping performance of the selected multimedia application and displaying one image from the visual data in response to detecting removal of the earphones, and wherein:
the output audible data and visual data are from a same multimedia content that is reproduced when the selected one multimedia application is performed;
the visual data comprises video data; and
the one image of the visual data is continuously displayed in the second mode until further user interaction after performing the selected one multimedia application.

20. The device of claim 19, wherein an on-screen image displayed via the display unit provides an indication of an incoming call, when the incoming call is received via the transceiver during the first mode and after the activation of the selected multimedia application.

21. The device of claim 19, wherein the audible data includes an audio component associated with at least a TV broadcast, video playback, or music playback.

22. The device of claim 19, wherein the visual data includes an image component associated with at least a TV broadcast, video playback, or music playback.

23. The device of claim 19, wherein the one image is a still image component of the visual data.

24. The device of claim 19, wherein the one image is an on-screen image allowing a user to select the multimedia application or an item from the multimedia menu.

25. A mobile device comprising:
a transceiver configured to send and receive signals via a wireless communication network;
a display configured to display information;
a connector configured to connect an earphone to the mobile device for outputting an audio component of a multimedia application; and
a processor configured to:
control the earphone to output audible data and control the display to output visual data when the multimedia application is performed;
detect removal of the earphone from the connector while performing the multimedia application;
stop performing the multimedia application and cause the display to display one image from the visual data in response to detecting removal of the earphone; and
control the display to continuously display the one image until further user interaction is performed after stopping the performing the multimedia application,
wherein:
the output audible data and visual data are from a same multimedia content that is reproduced when the multimedia application is performed; and
the visual data comprises video data.

26. The mobile device of claim 25, wherein the processor is further configured to stop outputting the audible data to the connector in response to detecting the removal of the earphone.

27. The mobile device of claim 25, wherein:
the visual data output when the multimedia application is performed comprises video data including a plurality of images; and
the displayed one image is one of the plurality of images that is displayed on the display at a moment when removal of the earphone is detected.

* * * * *